United States Patent
Maluf et al.

(10) Patent No.: US 12,232,074 B2
(45) Date of Patent: Feb. 18, 2025

(54) CORRECTING FOR ANTENNAE SPATIAL DISTORTIONS IN RADIO FREQUENCY (RF) LOCALIZATIONS

(71) Applicant: Cisco Technology, Inc., San Jose, CA (US)

(72) Inventors: David A. Maluf, Mountain View, CA (US); Huy Phuong Tran, Santa Clara, CA (US); Avinash Kalyanaraman, San Jose, CA (US); Paul Anthony Polakos, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 215 days.

(21) Appl. No.: 17/735,694

(22) Filed: May 3, 2022

(65) Prior Publication Data

US 2023/0362875 A1  Nov. 9, 2023

(51) Int. Cl.
*H04W 64/00* (2009.01)
*G01S 13/76* (2006.01)

(52) U.S. Cl.
CPC ........... *H04W 64/003* (2013.01); *G01S 13/76* (2013.01)

(58) Field of Classification Search
None
See application file for complete search history.

(56) References Cited

U.S. PATENT DOCUMENTS

| | | | |
|---|---|---|---|
| 10,756,939 B1 | 8/2020 | Bruzzone et al. | |
| 2008/0176583 A1* | 7/2008 | Brachet | H04W 4/029 |
| | | | 455/456.3 |
| 2008/0285530 A1 | 11/2008 | Dietrich et al. | |
| 2016/0323717 A1 | 11/2016 | Friday et al. | |
| 2019/0013856 A1 | 1/2019 | Frerking et al. | |
| 2022/0070607 A1* | 3/2022 | Ebner | H04W 4/33 |
| 2023/0176206 A1* | 6/2023 | Skoglar | G01S 13/876 |
| | | | 455/456.1 |

FOREIGN PATENT DOCUMENTS

CN 109977584 A 7/2019

* cited by examiner

*Primary Examiner* — Kenneth B Wells
(74) *Attorney, Agent, or Firm* — MERCHANT & GOULD P.C.

(57) ABSTRACT

Correcting for antennae spatial distortions in Radio Frequency (RF) localization may be provided. A plurality of actual locations associated with a plurality of Access Point (APs) may be received. Then a plurality of signal strengths associated with the plurality of APs may be received. Based on the plurality of signal strengths, a model may be created that models a plurality of inference errors respectively corresponding to the plurality of APs between a plurality of inferred locations respectively corresponding to the plurality of APs and the plurality of actual locations. The model may then be used in determining a location of a device.

17 Claims, 4 Drawing Sheets

305 →

Model
Forward Signal Propagation Model

- $M_{ij} = \dfrac{e_{ij} * K_i}{L_{ij}^n} \; E_j$ $(J^T J) x = J^T (m - \hat{m}) + \Sigma^{-1}$ Where $x = \{e_{ij}, K_i, E_j, n\}$ Contains the Random Independent Parameter and $\Sigma^{-1}$ is the Prior on $x$ $J^T J$ is the Hessian Matrix
And $J$ is the Jacobian of the Model $M_{ij}$ Computed as the differential terms of

- $J = \dfrac{dM}{dx}$

310 →

Uses Bayesian Estimation
Compute the Probability of Parameters Given the Measurements

- $P(e_{ij}, K_i, E_j, n \mid M_{ij}, L_{ij})$

⟶

315 →

Minimization of Error
Inverse Problem Estimation: Compare Model Data to Actual Data and Correct Model Parameters to Minimize Error

- Min $e = \| M_{ij} - \hat{M}_{ij} \|$

FIG. 3

CORRECTING FOR ANTENNAE SPATIAL DISTORTIONS IN RADIO FREQUENCY (RF) LOCALIZATIONS

TECHNICAL FIELD

The present disclosure relates generally to correcting for antennae spatial distortions.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 3 illustrates inverse model estimation; and

DETAILED DESCRIPTION

Overview

Figure 1:
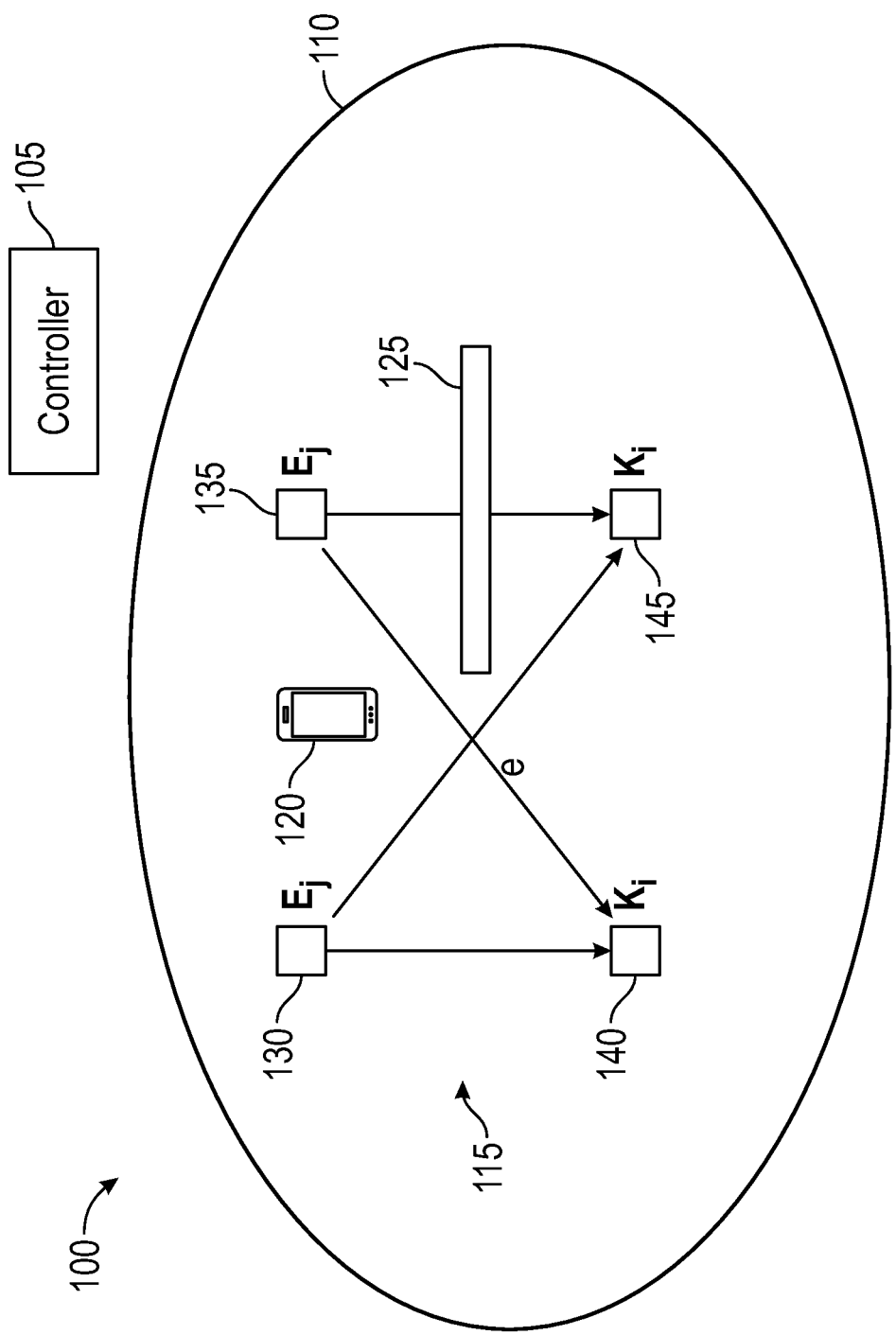
FIG. 1 is a block diagram of an operating environment for correcting antennae spatial distortions in Radio Frequency (RF) localization.

Correcting for antennae spatial distortions in Radio Frequency (RF) localization may be provided. A plurality of actual locations associated with a plurality of Access Point (APs) may be received. Then a plurality of signal strengths associated with the plurality of APs may be received. Based on the plurality of signal strengths, a model may be created that models a plurality of inference errors respectively corresponding to the plurality of APs between a plurality of inferred locations respectively corresponding to the plurality of APs and the plurality of actual locations. The model may then be used in determining a location of a device.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Antennae spatial distortion may comprise the effect of the near-field on an antennae to encompass primarily the effect of the components very close to the antennae (e.g., for both receiving (Rx) and transmitting (Tx)) affecting the shape of the near-field (e.g., final radiating shape). An environmental component (e.g., a nearby metal air duct) may have an effect on the far field in the order of the distance and may be considered having an effect on the signal shape especially when closer to the sender. The antennae spatial distortion may comprise a function of the environment where the antennae may be located (both Rx and Tx). Electromagnetic (EM) coupling between objects in the near-field region of the antenna (e.g., within several wavelengths) and the antenna itself may have an impact on the far-field radiation pattern. This impact may manifest itself as an environmentally dependent deviation from the open-space antenna radiation pattern. Gains at the transmit antenna may include the effect of the environment near the antenna. Also, the received signal may include all sensed signals including the multipaths and the special effects of the environment near the near field that may act as amplifiers collectors.

In indoor localization, a device may be localized in a world coordinate system. This world-coordinate localization may be performed by measuring relative distances between the device that is being localized and anchors whose world-coordinate locations may be known (i.e., pre-computed). Such anchors may comprise Access Points (APs). Distances to these APs may be computed based on Radio Frequency (RF) channel measurements and characteristics.

Because the device of interest may be localized with respect to a known anchor location, it may be important to know a precise location of the anchors. This is because any error in the measured anchor location may manifest in the computed location of the client. This true (i.e., actual) anchor location may be measured by installers using laser pointers that are projected to the corners of the deployment floor.

The presence, however, of inevitable indoor RF characteristics such as environment-specific multipath (e.g., metal railing behind an AP, walls, ceiling, etc.) may make the anchors behave as if they were physically away (e.g., closer or further) from the true measured location. As a result, despite knowing the true (i.e., actual) anchor locations, the presence of multipath in the environment may "move" the anchors. Embodiments of the disclosure may auto-correct the location of the APs back to the true (i.e., actual) world-coordinate location thus aiding in more precise indoor localization.

Antennae spatial distortion may be due to many factors including the indoor environment for example. System providers may localize a device using multiple APs. The process used in localization may leverage the radio signal that the AP receives from a target device.

The effect of the environment on the signal may be complex. While the objective may be to measure the shortest distance between a device and an AP by analyzing the Line-of-Sight (LOS) signal, the measurement itself may be noisy. For example, an estimation error may result in an average error of three meters between the actual device location and the estimated location.

The cause of the error may be many and may be difficult to isolate. One cause may be due to the multipath effect of signals that affect the measurement strengths taken at the AP. Receiving antennae of the AP may measure the cumulative signals. For indoors use cases where the APs may be located on ceilings, for example, it may be difficult to extract LOS from the rest due to neighboring near-field effects. Another type of influence may comprise the antennae gain made at the receivers.

Other use cases may comprise outdoor general radio tower triangulations. The correction factors extracted to assist in Wi-Fi localization may be computed for outdoors use cases when multiple radio towers may correct for distortions by registering the errors between measured and actual tower locations.

In order to improve the accuracy of localization, for example, embodiments of the disclosure may correct for antennae spatial distortion in RF localization based on Machine Learning (ML). Embodiments of the disclosure may infer errors and therefore compute the corrective signal gains for improved device localization. Neighbor Discovery Protocol (NDP) and beacon signals may be used among the APs to self-calibrate if their locations are known. Other anchors may be used. Embodiments of the disclosure may also improve outdoor localizations solutions.

FIG. 1 shows an operating environment 100 for correcting antennae spatial distortions in Radio Frequency (RF) localization. As shown in FIG. 1, operating environment 100 may comprise a controller 105, a coverage environment 110, a plurality of Access Point (APs) 115, a client device 120, and a wall 125. Plurality of APs 115 may comprise a first AP 130, a second AP 135, a third AP 140, and a fourth AP 145. While the example of FIG. 1 illustrates APs, embodiments of the disclosure are not limited to APs and may cover any radio capable of transmitting and receiving a signal.

Coverage environment 110 may comprise, but is not limited to, a Wireless Local Area Network (WLAN) comprising plurality of APs 115. The plurality of APs 115 may provide wireless network access (e.g., access to the WLAN) for client device 120. Each of the plurality of APs 115 may be compatible with specification standards such as, but not limited to, the Institute of Electrical and Electronics Engineers (IEEE) 802.11 specification standard for example. Coverage environment 110 may comprise, but is not limited to, an outdoor wireless environment, such as a mesh (e.g., a Wi-Fi mesh). Embodiments of the disclosure may also apply to indoor wireless environments and non-mesh environments.

Client device 120 may comprise, but is not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), a Virtual reality (VR)/Augmented reality (AR) device, or other similar microcomputer-based device. In the FIG. 1 example, client device 120 is shown as comprising a smart phone.

Controller 105 may comprise a Wireless Local Area Network controller (WLC) and may provision and control operating environment 100 (e.g., the WLAN). Controller 105 may allow the plurality of client devices to join operating environment 100. In some embodiments of the disclosure, controller 105 may be implemented by a Digital Network Architecture Center (DNAC) controller (i.e., a Software-Defined Network (SDN) controller) that may configure information for operating environment 100 in order to correct antennae spatial distortions in Radio Frequency (RF) localization consistent with embodiments of the disclosure.

The elements described above of operating environment 100 (e.g., controller 105, client device 120, first AP 130, second AP 135, third AP 140, and fourth AP 145) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
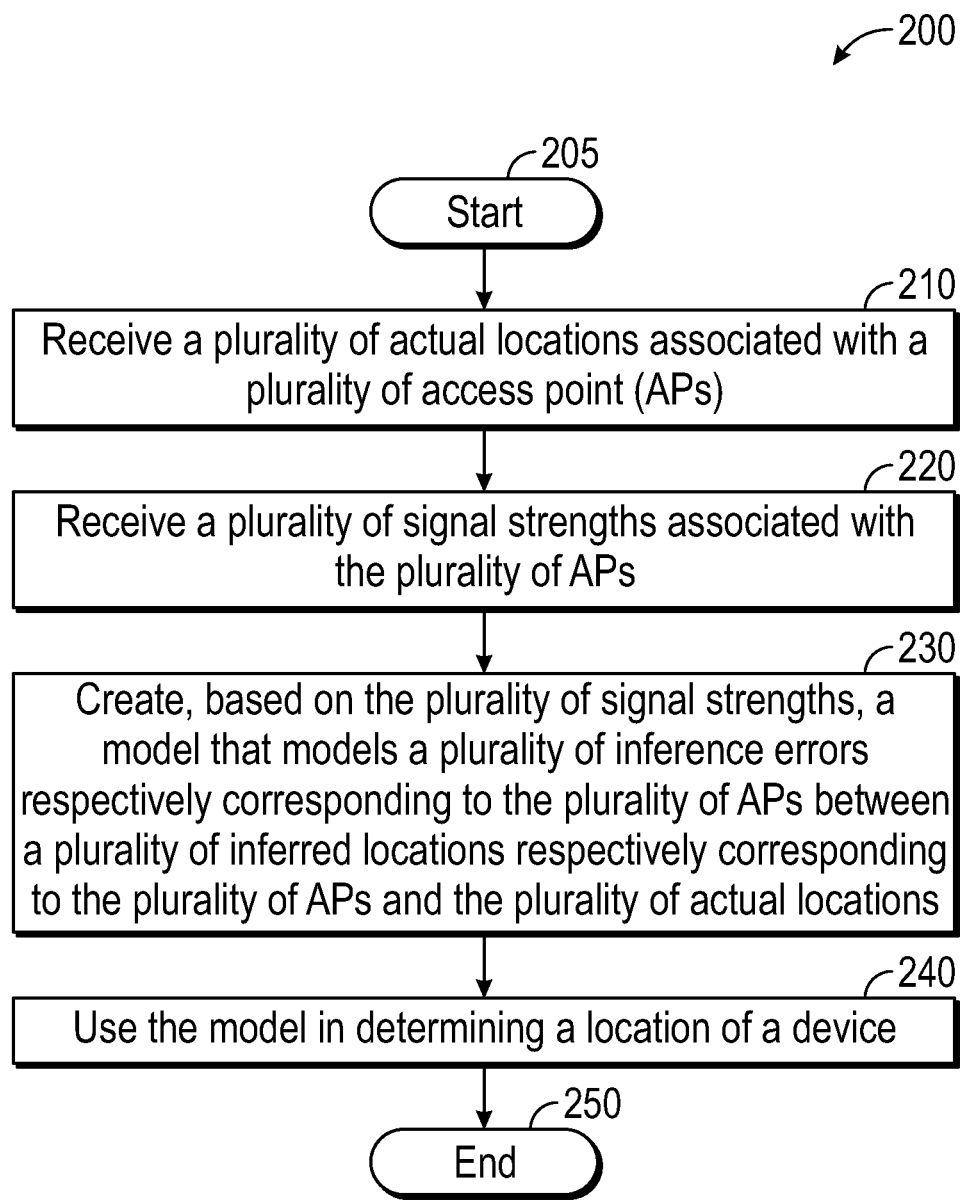
FIG. 2 is a flow chart of a method for correcting antennae spatial distortions in RF localization.

FIG. 2 is a flow chart setting forth the general stages involved in a method 200 consistent with an embodiment of the disclosure for correcting antennae spatial distortions in Radio Frequency (RF) localization. Method 200 may be implemented using controller 105 as described in more detail above with respect to FIG. 1. Ways to implement the stages of method 200 will be described in greater detail below. Consistent with embodiments of the disclosure, in the absence of actual knowledge of calibrating known distances, the measure of the time may be used and approximately compute distances from the speed of light. For example, some APs may be equipped with time measurement (e.g., Time Delay Measurements as (TDM)).

Method 200 may begin at starting block 205 and proceed to stage 210 where controller 105 may receive a plurality of actual locations associated with plurality of APs 115. For example, world-coordinate locations of plurality of APs 115 may be known (i.e., pre-computed) and saved in controller 105. As stated above, the actual (i.e., true) locations may be measured by installers of plurality of APs 115 using laser pointers that are projected to the corners of the deployment floor for example.

From stage 210, where controller 105 receives the plurality of actual locations associated with plurality of APs 115, method 200 may advance to stage 220 where controller 105 may receive a plurality of signal strengths associated with plurality of APs 115. For example, inference of the location of each AP antenna as observed by the other neighboring antennae may result in different location of the antennae when compared to their actual locations. This error between the inferred and actual may therefore be taken in consideration when inferring other devices and behavior locations.

Calibration may therefore be achieved by modeling the error between the inferred location of plurality of APs 115 and their actual locations. There may be a minimum number in a collection of APs that may transmit and receive radio signals. Also, each of these AP may be configured to receive the radio signals transmitted from the APs when they transmit. The NDP signal each of plurality of APs 115 broadcasts in a repeating behavior may be used, however, embodiments of the disclosure are not limited to NDP and beacons or anchors may be used.

Consistent with embodiments of the disclosure, in turn and at a specific time, one of the AP of plurality of APs 115 may transmit a radio signal and another AP may receive the transmitted signal. Ways to capture the signals strength may include, but not limited to obtaining Received Signal Strength Indicators (RSSI) or Channel State Information (CSI) for example. With embodiments of the disclosure, the AP positions may be known with precision in a desired accuracy range.

Once controller 105 receives the plurality of signal strengths associated with plurality of APs 115 in stage 220, method 200 may continue to stage 230 where controller 105 may create, based on the plurality of signal strengths, a model that models a plurality of inference errors respectively corresponding to plurality of APs 115 between a plurality of inferred locations respectively corresponding to plurality of APs 115 and the plurality of actual locations. For example, embodiments of the disclosure may model the plurality of inference errors as a convolution of the partial individual error contribution by each receiving AP (of the plurality of APs 115) receiving a signal. The locations of the receiving APs may not be identical in their environment (e.g., due to distortion caused by wall 125). In this case, the transmitting AP may exhibit the same distortion from its localized environment while it is transmitting, but the receiving AP may have different distortions given their different location. With Machine Learning (ML) models, the effect of the transmitting AP may be factored out and the distortion factors on the receiving AP may be computed. The nature of the computation may be differential (e.g., in a mathematical sense) leading to the distortion gain factors to be multiplied to the incoming signal strength. The aforementioned describes the calibration process from a static known location of the APs, but this may be extended to other transmitting devices.

Consistent with embodiments of the disclosure, as illustrated by FIG. 3, inverse model estimation (as compared to forward estimation) may be used to create the aforementioned model. Equation 1 shows the relationship that is illustrated in the model pairwise dielectric of equation 2 that includes $i^{th}$ index (e.g., from N receivers) and $j^{th}$ index (e.g., from M senders). Receivers and senders may be from the same pool (e.g., plurality of APs 115). This may create a denser covariance matrix. Also, this may scale well due to the sparsity set by $M_{ij}$ (e.g., it may not be likely all M senders are observed by N receivers). Equation 2 illustrates where the same dielectric constant is used (i.e. e) between the senders and receivers. Equation 3 illustrates where a different dielectric constant is used (i.e. $e_{ij}$) between the senders and receivers. For example, wall 125 between second AP 135 and fourth AP 145 may cause a different dielectric constant than between first AP 130 and third AP 140 that may have a clear LOS.

$$E_r = \frac{e^* k}{R^2} E_s \quad \text{equation 1}$$

$$M_{ij} = \frac{e_{ij}^* K_i}{L^{n_{ij}}} E_j \quad \text{equation 2}$$

$$M_{ij} = \frac{e^* K_i}{L^{2_{ij}}} E_j \quad \text{equation 3}$$

$E_j$=Sender gains (see FIG. 1)
$K_i$=Receiver gains (see FIG. 1)
e=Dielectric constant
$e_{ij}$=paired dielectric parameter As shown in FIG. 3, the forward signal propagation model may be used (stage 305). The probability of parameters may then be determined using, for example, a Bayesian estimation (stage 310). Other estimation processes may be used, and embodiments of the disclosure are not limited to Bayesian estimation. Next, the minimization of error may be performed (stage 315). Inverse problem estimation may be used by comparing model data to actual data and model parameters may be corrected to minimize error for example.

The calibration gain factors may be used on future signals from other moving devices (e.g., client device 120) because these factors may be computed to factor out the effect of the local environment of the transmitter. The inference for localization may need to take signals as input in relative value (e.g., normalized) and not necessarily absolute signals to infer the localization.

The aforementioned process may be performed where the corrections factors may be computed in the physical space (e.g., x, y, and z) instead correcting the gain on the received signals. Other embodiments may use these corrective factors by mapping in the Euclidean physical space as a distribution error map (e.g., a heat map). These mapped results may help identify effective and non-effective physical locations of APs and therefore assist in positioning the APs for better results.

The inference may use a different number of receiving APs per transmitter and the receiver selection may also be optimized to meet further resolution criteria. One example may be to select the optimal AP in the localization process, for example, when a receiving AP's contributions for localization may be found counterproductive (i.e., an error variance of correction may be too wide). In this case, the AP may be removed from the list of APs in the localization process.

After controller 105 creates, based on the plurality of signal strengths, the model that models the plurality of inference errors respectively corresponding to plurality of APs 115 between the plurality of inferred locations respectively corresponding to plurality of APs 115 and the plurality of actual locations in stage 230, method 200 may proceed to stage 240 where controller 105 may use the model in determining a location of a device (e.g., client device 120). For example, knowing the plurality of inference errors between the plurality of inferred locations and the plurality of actual locations, controller 105 may triangulate the location of client device 120 more accurately because the effect of the local environment of the transmitter may be factored out. Once controller 105 uses the model in determining the location of the device (e.g., client device 120) in stage 240, method 200 may then end at stage 250.

Figure 4:
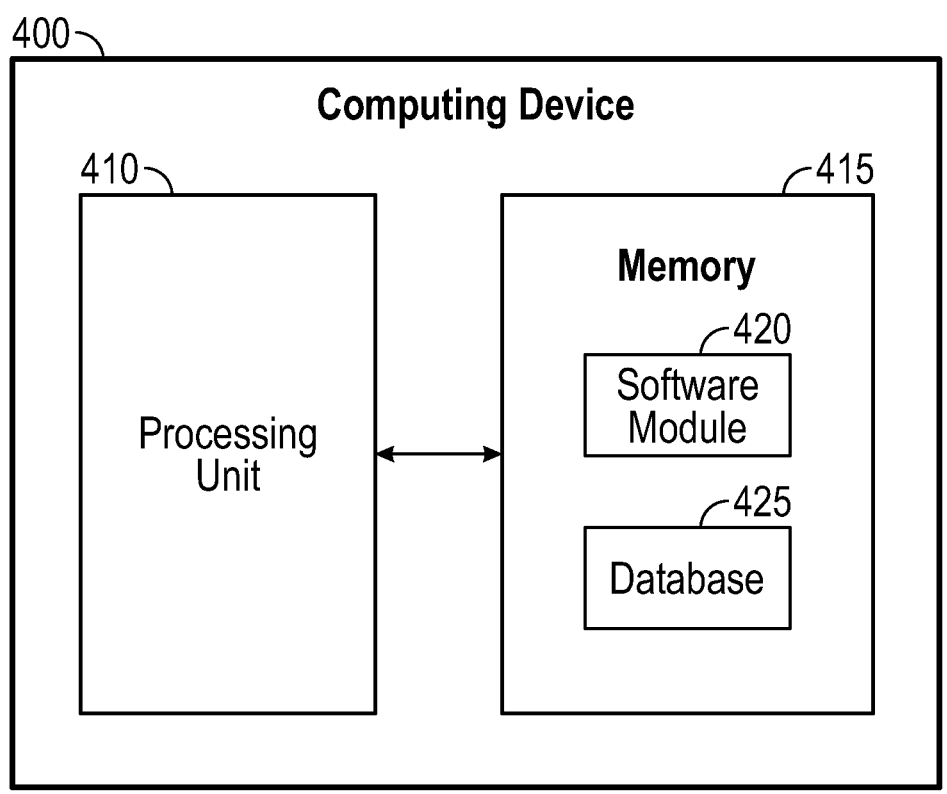
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for correcting antennae spatial distortions in Radio Frequency (RF) localization as described above with respect to FIG. 2. Computing device 400, for example, may provide an operating environment for controller 105, client device 120, first AP 130, second AP 135, third AP 140, or forth AP 145. Controller 105, client device 120, first AP 130, second AP 135, third AP 140, and forth AP 145 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. In more specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

The invention claimed is:

1. A method comprising:
receiving a plurality of actual locations associated with a plurality of radios;
receiving a plurality of signal strengths associated with the plurality of radios;
creating, based on the plurality of signal strengths, a model that models a plurality of inference errors respectively corresponding to the plurality of radios between a plurality of inferred locations respectively corresponding to the plurality of radios and the plurality of actual locations, wherein the model models the plurality of inference errors as a convolution of a partial individual error contribution by each of the plurality of radios; and using the model in determining a location of a device.

2. The method of claim 1, wherein creating the model comprises using a Machine Learning (ML) process to create the model.

3. The method of claim 1, wherein the plurality of signal strengths comprise Received Signal Strength Indicators (RSSI).

4. The method of claim 1, wherein the plurality of signal strengths are obtained from Channel State Information (CSI).

5. The method of claim 1, wherein the plurality of signal strengths are associated with beacons.

6. The method of claim 1, wherein the plurality of signal strengths are obtained using Neighbor Discovery Protocol (NDP).

7. A system comprising:
a memory storage; and
a processing unit coupled to the memory storage, wherein the processing unit is operative to:
receive a plurality of actual locations associated with a plurality of Access Point (APs);
receive a plurality of signal strengths associated with the plurality of APs;
create, based on the plurality of signal strengths, a model that models a plurality of inference errors respectively corresponding to the plurality of APs between a plurality of inferred locations respectively corresponding to the plurality of APs and the plurality of actual locations, wherein the model models the plurality of inference errors as a convolution of a partial individual error contribution by each of the plurality of APs; and
use the model in determining a location of a device.

8. The system of claim 7, wherein the processing unit being operative to create the model is operative to use a Machine Learning (ML) process to create the model.

9. The system of claim 7, wherein the plurality of signal strengths comprise Received Signal Strength Indicators (RSSI).

10. The system of claim 7, wherein the plurality of signal strengths are obtained from Channel State Information (CSI).

11. The system of claim 7, wherein the plurality of signal strengths are associated with beacons.

12. The system of claim 7, wherein the plurality of signal strengths are obtained using Neighbor Discovery Protocol (NDP).

13. A computer-readable medium that stores a set of instructions which when executed perform a method executed by the set of instructions comprising:
receiving a plurality of actual locations associated with a plurality of Access Point (APs);
receiving a plurality of signal strengths associated with the plurality of APs;
creating, based on the plurality of signal strengths, a model that models a plurality of inference errors respectively corresponding to the plurality of APs between a plurality of inferred locations respectively corresponding to the plurality of APs and the plurality of actual locations, wherein the model models the plurality of inference errors as a convolution of a partial individual error contribution by each of the plurality of APs; and
using the model in determining a location of a device.

14. The computer-readable medium of claim 13, wherein creating the model comprises using a Machine Learning (ML) process to create the model.

15. The computer-readable medium of claim 13, wherein the plurality of signal strengths comprise Received Signal Strength Indicators (RSSI).

16. The computer-readable medium of claim 13, wherein the plurality of signal strengths are obtained from Channel State Information (CSI).

17. The computer-readable medium of claim 13, wherein the plurality of signal strengths are associated with beacons.

* * * * *